US009069432B2

(12) United States Patent
Eylon

(10) Patent No.: US 9,069,432 B2
(45) Date of Patent: Jun. 30, 2015

(54) COPY AND PASTE BUFFER

(75) Inventor: Yaniv Eylon, Kibbutz Hasolelim (IL)

(73) Assignee: Red Hat Israel, Ltd., Raanana (IL)

( * ) Notice: Subject to any disclaimer, the term of this patent is extended or adjusted under 35 U.S.C. 154(b) by 714 days.

(21) Appl. No.: 13/306,737

(22) Filed: Nov. 29, 2011

(65) Prior Publication Data

US 2013/0139087 A1 May 30, 2013

(51) Int. Cl.
*G06F 3/0481* (2013.01)
*G06F 3/048* (2013.01)

(52) U.S. Cl.
CPC ...................................... *G06F 3/048* (2013.01)

(58) Field of Classification Search
CPC .............................. G06F 9/543; G06F 3/0481
USPC .......................................................... 715/770
See application file for complete search history.

(56) References Cited

U.S. PATENT DOCUMENTS

| | | | | |
|---|---|---|---|---|
| 7,689,925 | B2 * | 3/2010 | Hahn et al. ..................... | 715/770 |
| 8,429,551 | B2 * | 4/2013 | Kim et al. ..................... | 715/770 |
| 8,577,904 | B2 * | 11/2013 | Marston ........................ | 707/756 |
| 2003/0076364 | A1 * | 4/2003 | Martinez et al. .............. | 345/810 |
| 2004/0054689 | A1 * | 3/2004 | Salmonsen et al. ......... | 707/104.1 |
| 2006/0218492 | A1 * | 9/2006 | Andrade ....................... | 715/523 |
| 2007/0061747 | A1 * | 3/2007 | Hahn et al. ..................... | 715/764 |
| 2010/0077004 | A1 * | 3/2010 | Abel et al. ..................... | 707/781 |
| 2011/0138283 | A1 * | 6/2011 | Marston ........................ | 715/724 |
| 2011/0202971 | A1 * | 8/2011 | Margolin .......................... | 726/3 |
| 2013/0339889 | A1 * | 12/2013 | Bastide et al. ................ | 715/770 |
| 2014/0068037 | A1 * | 3/2014 | Eylon et al. ................... | 709/222 |
| 2014/0157168 | A1 * | 6/2014 | Albouyeh et al. ............ | 715/770 |

OTHER PUBLICATIONS

ClipX, a clipboard history manager, version 1.0.3.8 released on Nov. 30, 2005, available online at [http://bluemars.org/clipx/].*
ClipX, a clipboard history manager, version 1.0.3.8 released on Nov 30th, 2005, available online at [http://bluemars.org/clipx/].*
Ditto, working screenshot of Ditto clipboard software, version 3.15.4, released on Mar. 27, 2008, 13 pages.*
M8 Software, "M8 Free Multi Clipboard", http://m8software.com/clipboards/freeclip/freeclip.htm, [retrieved on Apr. 5, 2012].
Wikipedia, "Clipboard (computing)", http://en.wikipedia.org/wiki/Clipboard_%28software%29, Feb. 2011[retrieved on Apr. 6, 2012].
ClipMagic—Windows Clipboard Extender, http://www.clipmagic.com/windows-clipboard.html, 2011 [retrieved on Apr. 5, 2012].

* cited by examiner

*Primary Examiner* — Reza Nabi
(74) *Attorney, Agent, or Firm* — Lowenstein Sandler LLP

(57) ABSTRACT

Data from multiple source applications may be coped and stored in a buffer as data items. A user may iterate through the data items stored in the buffer after the source applications have been closed. The user may select one or more of the data items in the buffer and copy the selected one or more data items into a target application.

20 Claims, 7 Drawing Sheets

COPY AND PASTE BUFFER

TECHNICAL FIELD

Embodiments of the present invention relate to managing data items in a computer system, and more specifically, to a systems and method for copying and pasting data items across multiple applications.

BACKGROUND

Using multiple applications to perform multiple tasks is now prevalent in computing systems. A user may use one application for word processing, another application to generate a spreadsheet, yet another application to browse the web, and still another application to view images or playback videos. A user may wish to use data handled by one application (e.g., text, or an image) in another application. The user may do so by "copying" the data from a source application and "pasting" the data to a target application.

Certain applications such as the Microsoft Office® suite of applications allow users to copy multiple data items between applications from the same vendor (i.e., between Microsoft® applications using Microsoft Clipboard®). However, a user is typically not allowed to copy multiple data items between applications from different vendors, e.g., produced/sold by different companies. In addition, a user may not be able to copy data items from source applications to one or more target applications if the user issues a paste command after the source applications are no longer executing. For example, once a word processing application stops executing (e.g., in response to a user request or abnormal termination), the user may no longer be able to use data which was previously copied from the word processing application, in another application (e.g., a web browser or a media view). Certain user applications (e.g., the ClipMagic® user application) provide the capability to copy multiple data items between applications from different vendors. However, these user applications should be separately downloaded and installed onto a computing system and the capability to copy multiple data items is not available unless the user application begins execution (e.g., is started) on the computing system. In addition, if these user applications stop executing (e.g., in response to a user request to close the application or abnormal termination), the capability to copy multiple data items is not available until the user applications are restarted.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

A method and system for copying and pasting data on a computing system are described. The computing system may comprise a computing device (e.g., a computer, a laptop computer, a personal digital assistant (PDA)) or a virtual machine (VM)). In one embodiment, multiple applications may be executing on the computing system in conjunction with an operating system. A user may copy data (e.g., one or more data items) from any number of source applications and paste the copied data items into any target application.

A copy/paste tool may operate on the computing system to receive copy commands issued by a user of the computing system. The copy command may indicate that a data item (e.g., text, image, multimedia data, etc.) selected by the user is to be copied and stored in a buffer. The buffer may store multiple data items copied by the user from different source applications. The copy/paste tool may receive an iterate command, which may indicate that the data items stored in the buffer should be iterated through and displayed to the user (e.g., via a preview displayed on a screen). The copy/paste tool may receive a paste command, which may indicate that one of the data items in the buffer is to be pasted into a target application.

In one embodiment, the copy/paste tool is part of a kernel of an operating system executing on the computing system. The copy/paste tool may store the data items copied from multiple source applications executing on the computing system and may paste the data items into various target applications executing on the computing system. The source and target applications may be unrelated programs (e.g., from different suites of applications and/or offered by different vendors). In one embodiment, the buffer that stores the data items may remain accessible to the copy/paste tool even if the source applications are no longer executing on the computing system (e.g., have been closed by the user or have crashed).

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
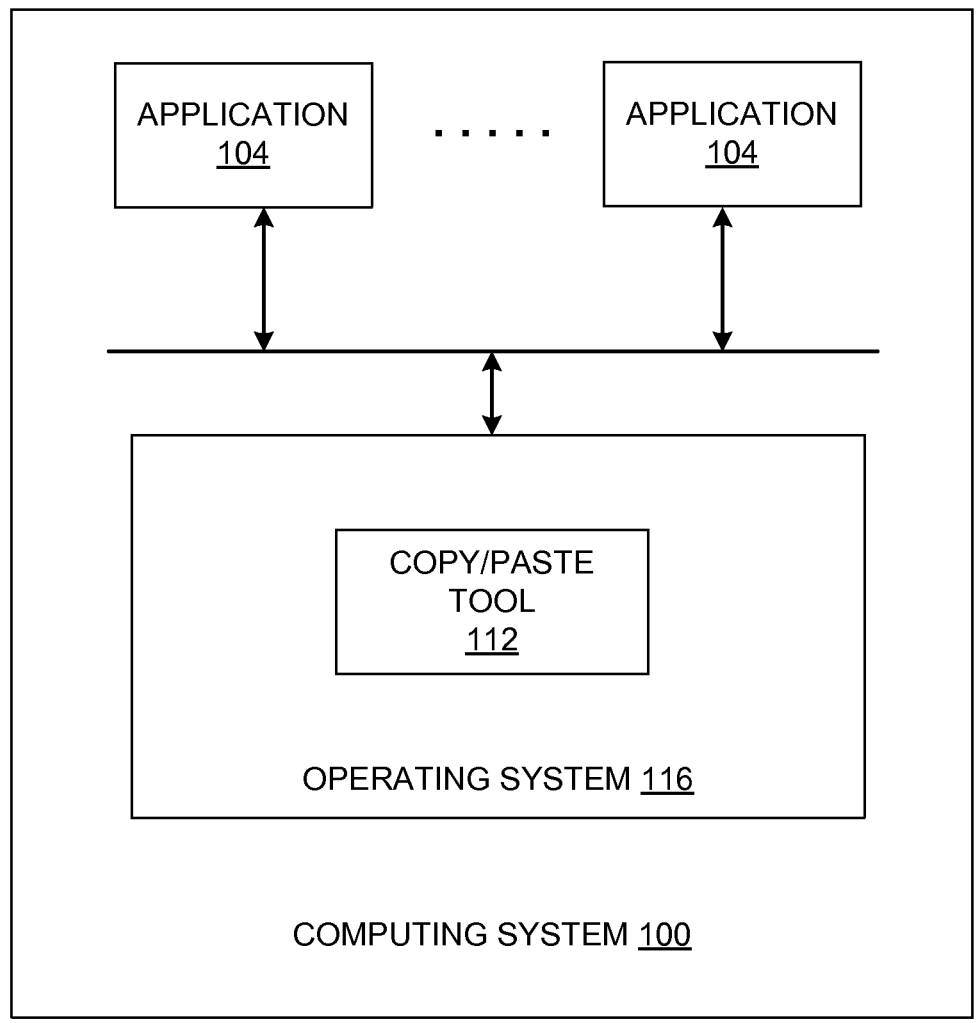
FIG. 1 is a block diagram of an exemplary computing system in which embodiments of the invention may operate.

FIG. 1 is a block diagram of an exemplary computing system 100 in which embodiments of the invention may operate. The computing system 100 may be a personal computer (PC), a server computer, a personal digital assistant (PDA), a smart phone, a laptop computer, or any other machine capable of executing a set of instructions (sequential or otherwise) that specify actions to be taken by that machine. In one embodiment, multiple applications 104 may execute simultaneously on the computing system 100. For example, one or more word processing programs, spreadsheet programs, media players, web browsers, video games, chat programs, etc., may execute simultaneously on the computing system 100. Any number of applications 104 may execute simultaneously on the computing system 100. For example, tens, hundreds or even thousands of applications may be executing simultaneously on the computing system 100. In addition, the applications 104 executing on the computing system 100 may be unrelated and provided by different vendors. For example, a first application may be offered by a first vendor (e.g., Microsoft Word®), and a second application may be offered by a second vendor (e.g., Google Chrome®) and both the first application and the second application may execute on the computing system 100. The applications 104 may include, but are not limited to, word processing applications, image editing applications, media viewer applications, presentation applications (e.g., applications to create presentations such as Microsoft PowerPoint®), spread sheet applications (e.g., Microsoft Excel®), media player applications, web browsing applications, chat applications, game applications, etc.

The computing system 100 includes an operating system 116. The operating system 116 may manage hardware resources (e.g., peripheral devices such as a disc drive, input/output devices, memory, hard disk etc.), software resources (e.g., drivers, system files, etc.), and may manage the execution of the applications 104.

The operating system 116 includes a copy/paste tool 112. Because the copy/paste tool 112 is part of the operating system 116, the capability to copy/paste multiple data items is available to the user whenever the operating system is executing. The user does not need to install/start/restart a user application (as discussed above), to provide this capability because the copy/paste tool 112 is integrated with the operating system 116. In addition, including the copy/paste tool 112 with the operating system 116 allows for greater compatibility when copying and pasting data items across multiple applications. For example, if a user application is used to copy/paste multiple data items, the user application may not be compatible with all the different source and target applications (e.g., data items may not be properly copied from or pasted into applications). However, if the operating system 116 itself provides the capability to copy/paste multiple date items (e.g., via the copy/paste tool 112), there may not be compatibility issues, because all of the applications will be compatible with the operating system 116 in order to execute on the computing system 100. The copy/paste tool 112 may receive a copy command, to copy a data item (e.g., text, image, other data) selected by the user from one of applications 104 executing on the computing system 100. In one embodiment, the copy command may be a keyboard inputs (e.g., the keys "Ctrl+C" or some other set of keystrokes). In another embodiment, the copy command may be a combination of inputs (e.g., mouse clicks and/or key strokes) received from one or more input/output devices (e.g., mouse, keyboard, touchpad, etc.). Multiple copy commands may be received and each copy command may copy a data item from one of the applications 104. The copy/paste tool 112 may store the multiple data items copied from the applications 104 (e.g., source applications) in a buffer.

When the source applications 104 are no longer executing (e.g., if they crash, or are closed by the user at different time intervals, etc.), the data items remain in the buffer and remain accessible by the copy/paste tool 112. The user may begin execution of another application 104 (e.g., a target application) after the multiple applications 104 are no longer executing. The copy/paste tool 112 may also receive an iterate command to iterate through the multiple data items which are stored in the buffer. In one embodiment, the iterate command is in the form of keyboard input (e.g., the keys "Shift+V" or some other set of keystrokes). In another embodiment, the iterate command may be a combination of inputs (e.g., mouse clicks and/or key strokes) received from one or more input/output devices (e.g., mouse, keyboard, touchpad, etc.).

In one embodiment, the copy/paste tool 112 may display a preview of the data items in the buffer in response to the iterate command. For example, the copy/paste tool 112 may display all of the data items to the user in a list and may highlight the data item corresponding to the current iteration through the multiple data items. In another example, the copy/paste tool 112 may display a preview of a single data item corresponding to the current iteration through the multiple data items. By providing a preview of a single data time, more of the data associated with the single data item can be displayed to the user. For example, if the single data item includes a full sentence, then providing a preview of the single data item allows the complete sentence to be displayed to the user, versus part of the sentence if multiple data items were displayed to the user. Displaying more data to the user for the single data item may assist the user in deciding whether to select the data item from the buffer. The preview of the data item may be displayed to the user to assist the user in selecting a desired data item from the multiple data items in the buffer. In another embodiment, the preview may be displayed for a certain period of time (e.g., for 5 seconds, 10 seconds, etc.) after the iterate command is received. After the certain period of time, the preview is no longer displayed to the user. This may allow a user to continue work without having the preview obscure other items on the screen (e.g., other application windows, data, images, text, etc.).

The copy/paste tool 112 may further receive a paste command to paste the selected (e.g., desired) data item into the target application 104. In one embodiment, the paste command may be in the form of keyboard input (e.g., "the keys Ctrl+V" or some other set of keystrokes) or a combination of inputs (e.g., mouse clicks and/or keystrokes). In one embodiment, multiple data items may be selected by the user and the multiple data items may be pasted into the target application 104. For example, as the user iterates through the data items in the buffer, the user may select multiple data items by clicking on multiple data items from the list displayed to the user. In another example, the user may select multiple data items by using a keyboard shortcut (e.g., "Shift+X") to select data items from the buffer as the user iterates through the multiple data items in the buffer.

In one embodiment, the computing system 100 may not be a physical system, but rather a virtual system, such as a virtual machine (VM). A VM may provide a virtual desktop for a user. From the user's point of view, the virtual desktop functions as a physical desktop (e.g., a personal computer) and is indistinguishable from a physical desktop. The VM may include a guest operating system 116 and may run on top of a hypervisor or host operating system executing on a hardware platform of a virtual machine host. The virtual machine host may include one or more VMs. Multiple applications 104 may execute on each VM in conjunction with a guest operating system 116 of the VM. The copy/paste tool 116 may function as described above, within the VM.

Figure 2:
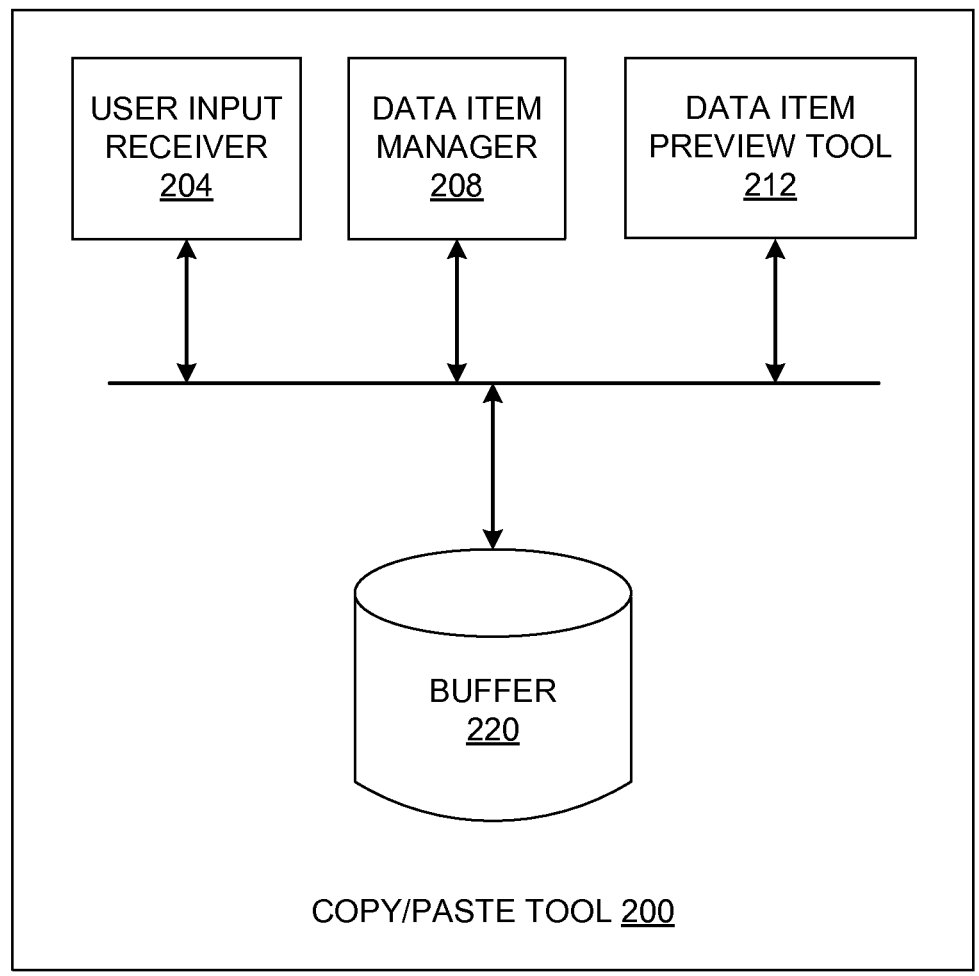
FIG. 2 is a block diagram illustrating one embodiment of a copy/paste tool.

FIG. 2 is a block diagram illustrating one embodiment of a copy/paste tool 200. The copy/paste tool 200 may include a user input receiver 204, a data item manager 208, a data item preview tool 212, and a buffer 220. More or less components may be included in the copy/paste tool 200 without loss of generality.

The user input receiver 204 may receive user input from the user via one or more input/output devices (e.g., mouse, keyboard, touch screen, touch pad, etc.). The user input receiver 204 may receive the user input and determine whether the input corresponds to a command, such as a copy command, an iterate command, and/or a paste command. The buffer 220 may store one or more data items selected by the user and copied from the applications 104. In one embodiment, the buffer 220 may be part of a memory device or a device which is capable or reading/writing data. For example, the buffer may be one or more of a read-only memory (ROM), random access memory (RAM), flash memory, a disc drive (e.g., a CD-ROM drive), and a magnetic disc drive (e.g., floppy disk or hard disk). Although buffer 220 is shown as part of the copy/paste tool 200, in other embodiments, the buffer 220 may be separate from the copy/paste tool (e.g., a portion of storage space in a hard disk). In one embodiment, the buffer 220 may be a persistent storage (e.g., a hard disk, a flash memory, etc.). This may allow the data items stored in the buffer 220 to remain available even if the computing system is restarted.

The data item manager 208 may receive and manage data items which are selected and copied from the applications 104. For example, as data items are added and/or removed from the buffer 220, the data item manager 208 may update the list of data items. In another embodiment, the data item manager 208 may also regulate the maximum number of items which can be stored in the buffer 220. For example, the data item manager 208 may only allow 50 data items or 25 data items to be stored in the buffer 220. This may prevent the number of data items stored in the buffer 220 from becoming too large and/or unmanageable and/or requiring a manual operation from a user to remove data items from the buffer 220. For example, without regulating the maximum number, there could be hundreds of data items in the buffer which the user may iterate through in order to find a desired data item. Data items may be removed from the buffer 220 (e.g., without any user interaction) in order to allow new data items to be added into the buffer 220. In a further embodiment, the data item manager 208 may control how data items are added to and/or removed from the buffer 220. For example, the data item manager 208 may add and/or remove data items from the buffer 220 using a last-in-first out (LIFO) method. In another example, the data item manager 208 may add and/or remove data items from the buffer 220 using a first-in-first out (FIFO) method. In a further example, the data item manager 208 may remove the least recently used (e.g., least recently accessed) data item in the buffer 220 to allow new data items to be added when the buffer 220 is full. It should be understood that in other embodiments, the data item manager 208 may use any method or algorithm for determining how data items are added and/or removed from the buffer 220. In one embodiment, the user may select one or more data items to be removed from the buffer 220, using one or more input/output devices (e.g., keyboard, mouse, etc.)

The data item preview tool 212 may provide a preview of one or more of the data items in the buffer 220 to the user when a copy, iterate, and/or paste command is received. The user may use the preview to determine whether to select a data item from the buffer 220 and paste the selected data item into a target application 104. In one embodiment, the data item preview tool 212 may provide a list of all the data items in the buffer 220, to the user. For example, the data item preview tool 212 may provide a list of data items where each data item is shown as a row in the list. A portion of the data item or the complete data item may be shown in the list. In another embodiment, the data item preview tool 212 may provide a preview of only one data item at a time. For example, a portion of a single data item or the complete single data item may be displayed to the user.

The data item preview tool 212 may also process iterate commands received by the copy/paste tool 200. In one embodiment, the iterate commands may be used by a user to iterate through the data items in the buffer 220 and select one or more data items for pasting into the target application 104. For example, the data item preview tool 212 may display a list of all the data items in the buffer 220. The data item preview tool 212 may receive iterate commands and may highlight the next data item in the list as each iterate command is received. In another example, the data item preview tool 212 may display a single data item as each iterate command is received. In another embodiment, the data item preview tool 212 may not display the preview of one or more data items only unless an iterate command is received. For example, the list of all data items in the buffer 220 is not displayed to the user unless an iterate command is received. In one embodiment, data item preview tool 212 may provide a preview of the data items in the buffer 220 and may also iterate through the data items in the buffer 220, in response to the iterate command. For example, if an iterate command (e.g., Shift+V) is received, the copy/paste tool 200 may provide a preview to the user. The same iterate command (e.g., Shift+V) may also be used to iterate through the data items in the buffer 220. This allows the user to preview the data items in the buffer and iterate through the data items in the buffer without having to use a different command (e.g., up/down keys or mouse inputs).

Figure 3:
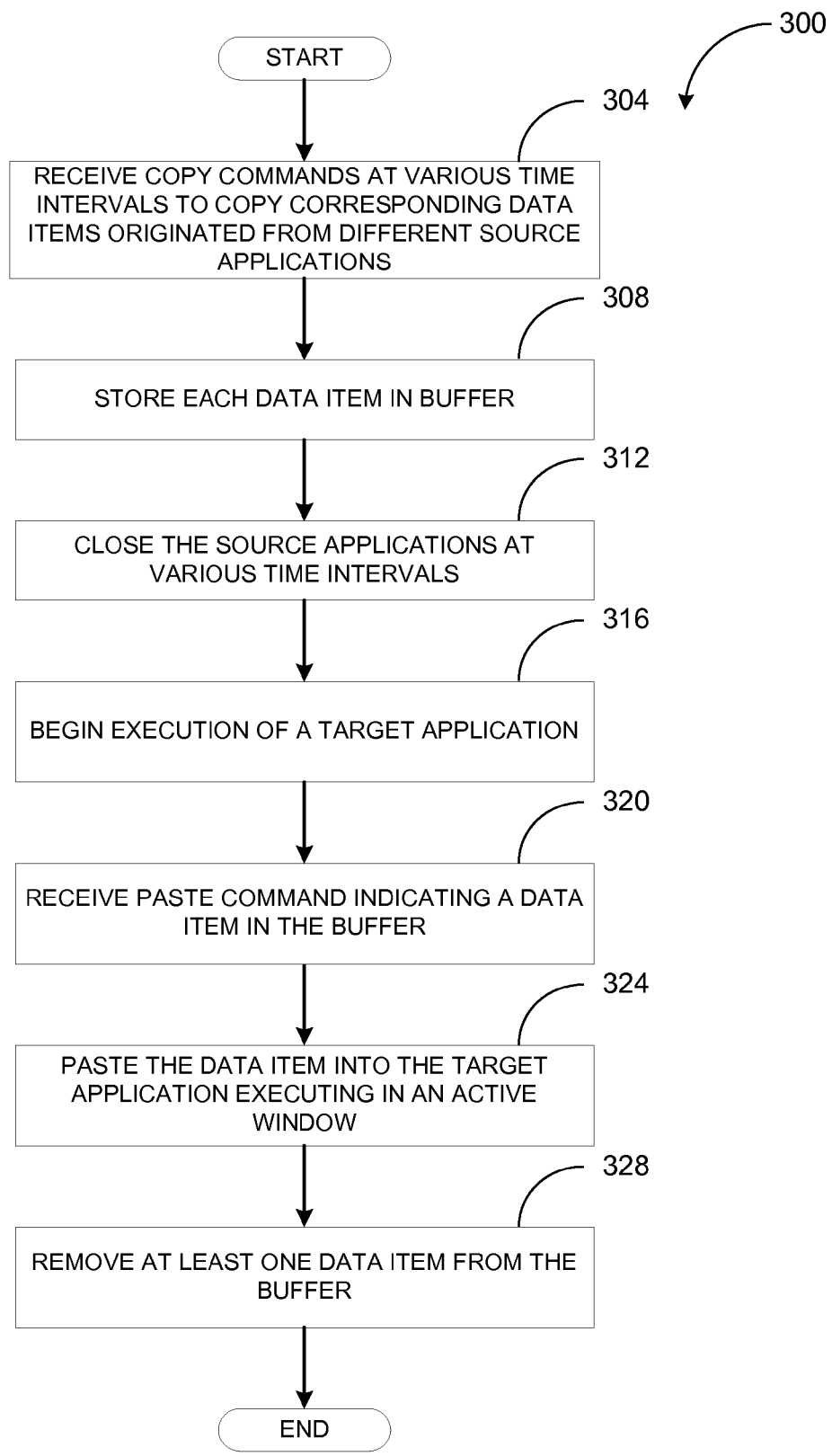
FIG. 3 is a flow diagram illustrating a method for copying/pasting data, in accordance with one embodiment.

FIG. 3 is a flow diagram illustrating a method for copying/pasting data, in accordance with one embodiment. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a computing system (e.g., the operating system 116 of FIG. 1).

Referring to FIG. 3, the method 300 starts with the operating system receiving copy commands at various time intervals, to copy corresponding data items originated from different source applications (block 304). For example, a first copy command may be received to copy a first data item selected by a user from a first source application (e.g., Mozilla Firefox®) at time T1 and a second copy command may be received to copy a second data item selected by the user from a second source application (e.g., Microsoft Excel®) at time T2. At block 308, each data item is stored in a buffer.

The source applications are closed at various time intervals at block 312. For example, the first application may be closed at time T3 and the second application may be closed at time T4. In one embodiment, one or more of the source applications may be closed by the user. For example, the user may close a word processing application and a media viewer application. In another embodiment, one or more of the source applications may close due to a crash (e.g., an error in the execution) of the application. In one embodiment, the data items copied from the different source applications into the buffer will remain in the buffer after all of the source applications have been closed by the user or have crashed. In a further embodiment, the data items copied from the different source applications will remain in the buffer after all user applications on the computing system are closed (e.g., no user applications are executing on the computing system).

At block 316, execution of a target application (e.g., an application in which one or more data items will be pasted/copied into) begins. The execution of the target application may begin before or after the source applications are closed. In one embodiment, the execution of the target application may be initiated by a user. For example, the user may initiate execution of a spreadsheet program. In another embodiment, the execution of the target application may be automatic. For example, after an application has crashed, the application may be automatically restarted in order to let a user continue using the application.

After beginning the execution of the target application, a paste command indicating a data item in the buffer is received (block 320). For example, the keyboard input "Ctrl+V" may be received. In one embodiment, the paste command may indicate multiple data items stored in the buffer. In another embodiment, the paste command may be received after the user has iterated through the data items in the buffer and has selected one or more data items. One embodiment of a copy and paste method using an iteration command is discussed below in conjunction with FIGS. 4, 5A, and 5B. The data item indicated in the paste command is pasted into the target application which is executing in an active window (block 324). An active window may be a window which has been selected by the user (e.g. positioning a cursor inside it).

At block 328, at least one data item is removed from the buffer. In one embodiment, the data item may be removed because the maximum number of data items in the buffer is exceeded. For example, the buffer may store only 50 data items, and if a new data item is added, one of the 50 data items in the buffer may be removed to store the new data item. In another embodiment, the data item may be removed based on a user input selecting the data item for removal from the buffer. For example, the user may select a particular data item to be removed from the buffer, because the data item may no longer be used.

Figure 4:
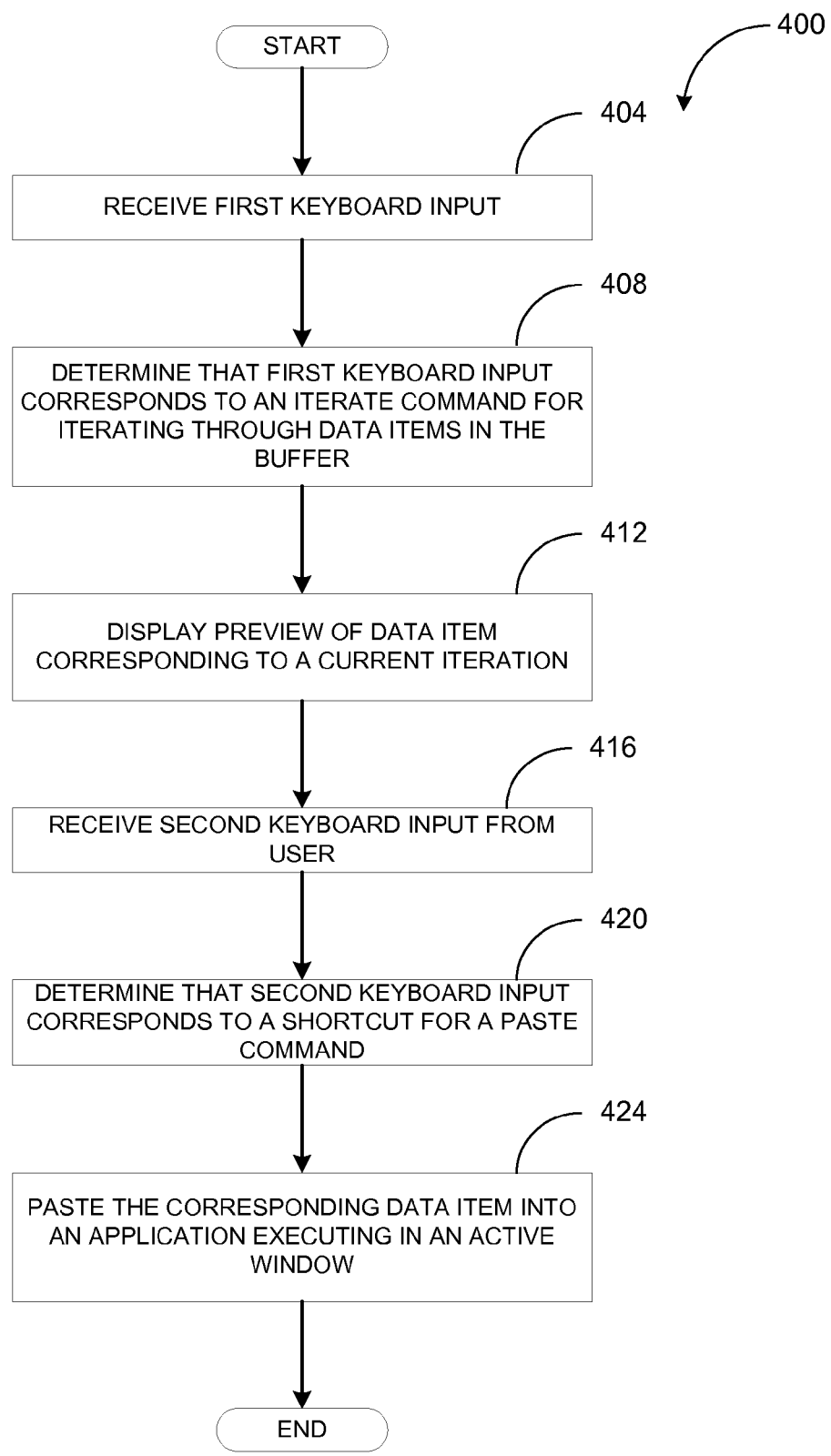
FIG. 4 is a flow diagram illustrating a method for copying/pasting data, in accordance with another embodiment.

FIG. 4 is a flow diagram illustrating a method for copying/pasting data, in accordance with another embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a computing system (e.g., the operating system 116 of FIG. 1).

Referring to FIG. 4, the method 400 starts with the operating system receiving a first user keyboard input (block 404). For example, the operating system may receive the keyboard input "Shift+V". At block 408, the operating system may process the first user keyboard input and determine that the first keyboard input corresponds to an iterate command (e.g., a shortcut) for iterating through the data items stored in the buffer.

The operating system displays a preview of the data item corresponding to a current iteration at block 412. In one embodiment, the preview displayed may be a list of all data items in the buffer. When an iterate command (e.g., shortcut) is received, the next data item in the list may be highlighted to indicate the current iteration through the data items in the buffer. For example, fourth data item in the buffer may be highlighted. When an iterate command (e.g., shortcut) is received, the fifth item of the buffer may become highlighted. In another embodiment, the preview displayed may only be a single data item from the buffer. The single data item displayed in the preview may correspond to the current iteration through all the data items in the buffer. For example, the current iteration may be on the fourth data item in the buffer. When an iterate command (e.g., shortcut) is received, the current iteration moves to the fifth data item in the buffer and the fifth data item may be displayed (e.g., previewed) to the user.

At block 416, the operating system receives a second keyboard input. For example, the operating system may receive the keyboard input "Ctrl+V". The operating system may process the second keyboard input received and determine that the second keyboard input corresponds to a shortcut for a paste command (block 420). The operating system pastes the corresponding data item into an application executing in an active window at block 424.

Figure 5A:
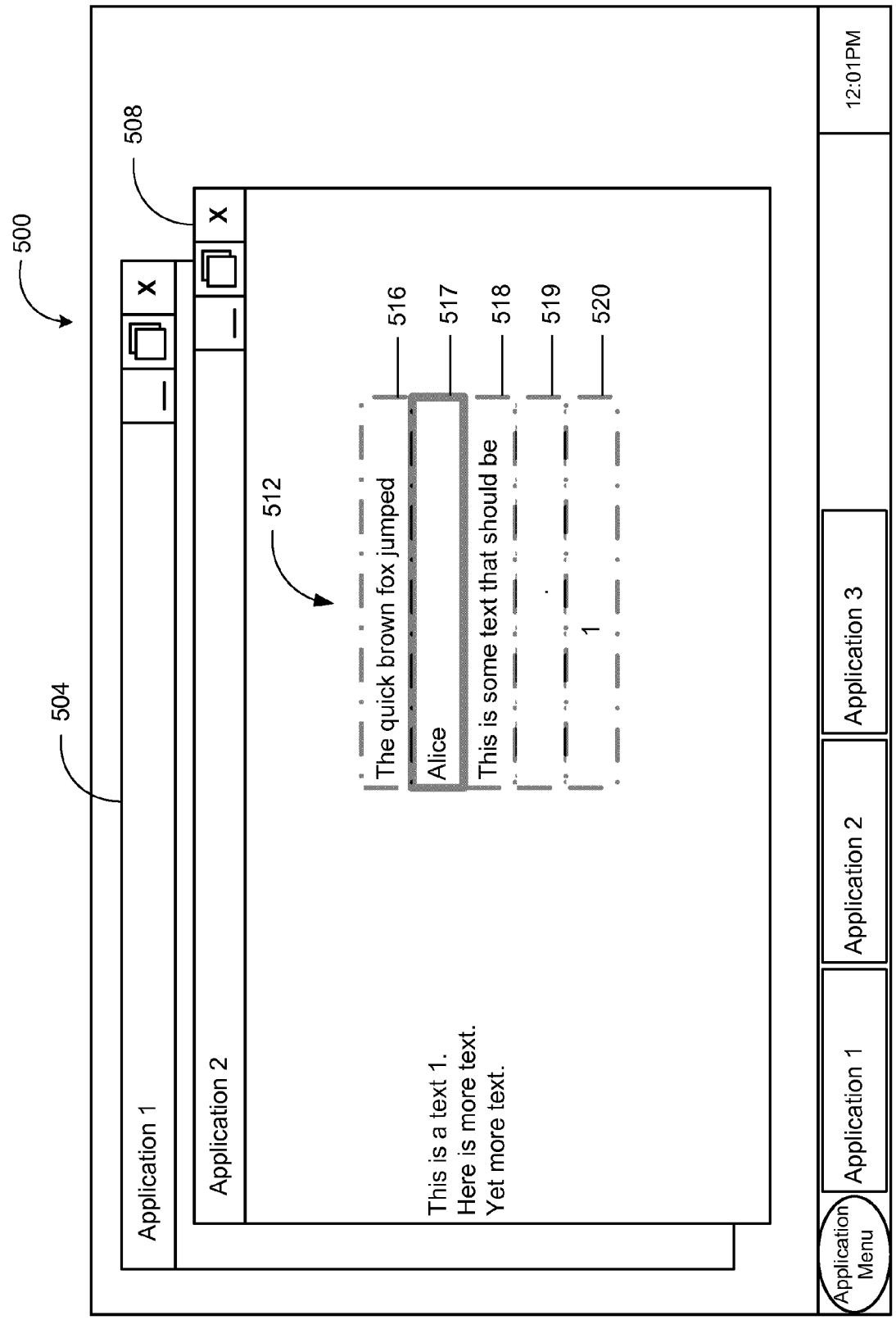
FIG. 5A illustrates an exemplary desktop environment, in accordance with one embodiment.

FIG. 5A illustrates a first exemplary desktop environment 500 of a computing system, in accordance with one embodiment. The desktop environment 500 may be provided to a user of a computing system. The desktop environment 500 includes two application windows 504 and 508 which are associated with two applications Application 1 and Application 2, executing on a computing system. The application window 508 is an active window since it is the window currently selected by the user. The application window 504 is a passive window since it is not currently selected by the user. As discussed above, a user may select a data (e.g., text, image, video frame, etc.) from one of the applications and the operating system copies the data item in a buffer. For example, the user may copy the text "This is a text 1" from Application 2 into the buffer by using a copy command (e.g., Ctrl+C).

When the operating system receives an iterate command (e.g., Shift+V), the operating system may provide a preview 512 of one or more data items in the buffer. The preview 512 may be a list of one or more of the data items currently stored in the buffer. As shown in FIG. 5A, there are five data items, 516, 517, 518, 519, and 520, stored in the buffer. The data items shown in the preview 512 may be the complete data item, or a portion of the data item. For example, if a data item contains a complete sentence, only part of the sentence may be displayed in the preview 512. Although only text data is shown in the preview 512, in other embodiments, other types of data such as images, multimedia data, etc., may be shown in the preview 512.

Data item 517, which contains the text "Alice" is the currently selected data item and is highlighted in the preview 512. As the operating system receives iterate commands (e.g., Shift+V), the next data item on the list will be highlighted to indicate the data item corresponding to the current iteration through the buffer. For example, when the next iterate command is received by the operating system, the data item 518 which contains the text "This is some text that should be . . . " will be highlighted. After the user iterates to the desired data item in the preview 512, the user may use a paste command (e.g., Ctrl+V) to paste the desired data item into an application executing in the active application window 508 for Application 2. For example, the data item 517 is the currently highlighted (e.g., selected) data item. When the operating system 116 receives a paste command, the text "Alice" will be pasted into Application 2, which is executing in the active application window 508.

In one embodiment, the preview 512 may only be displayed to the user when a copy command, an iterate command, and/or a paste command are received. For example, the preview 512 may not be displayed to the user until the user copies (via a copy command) data from an application. In another example, the preview 512 may not be displayed to the user until the user iterates (via an iterate command) through the data items in the buffer. This may provide the user with more space on the desktop environment 500. In another embodiment, the preview 512 may be semi-transparent when displayed to the user. In a further embodiment, the preview 512 may be displayed in a particular color or format to distinguish the preview 512 from other application windows (e.g., application windows 504 and 508) shown in the desktop environment 500.

Figure 5B:
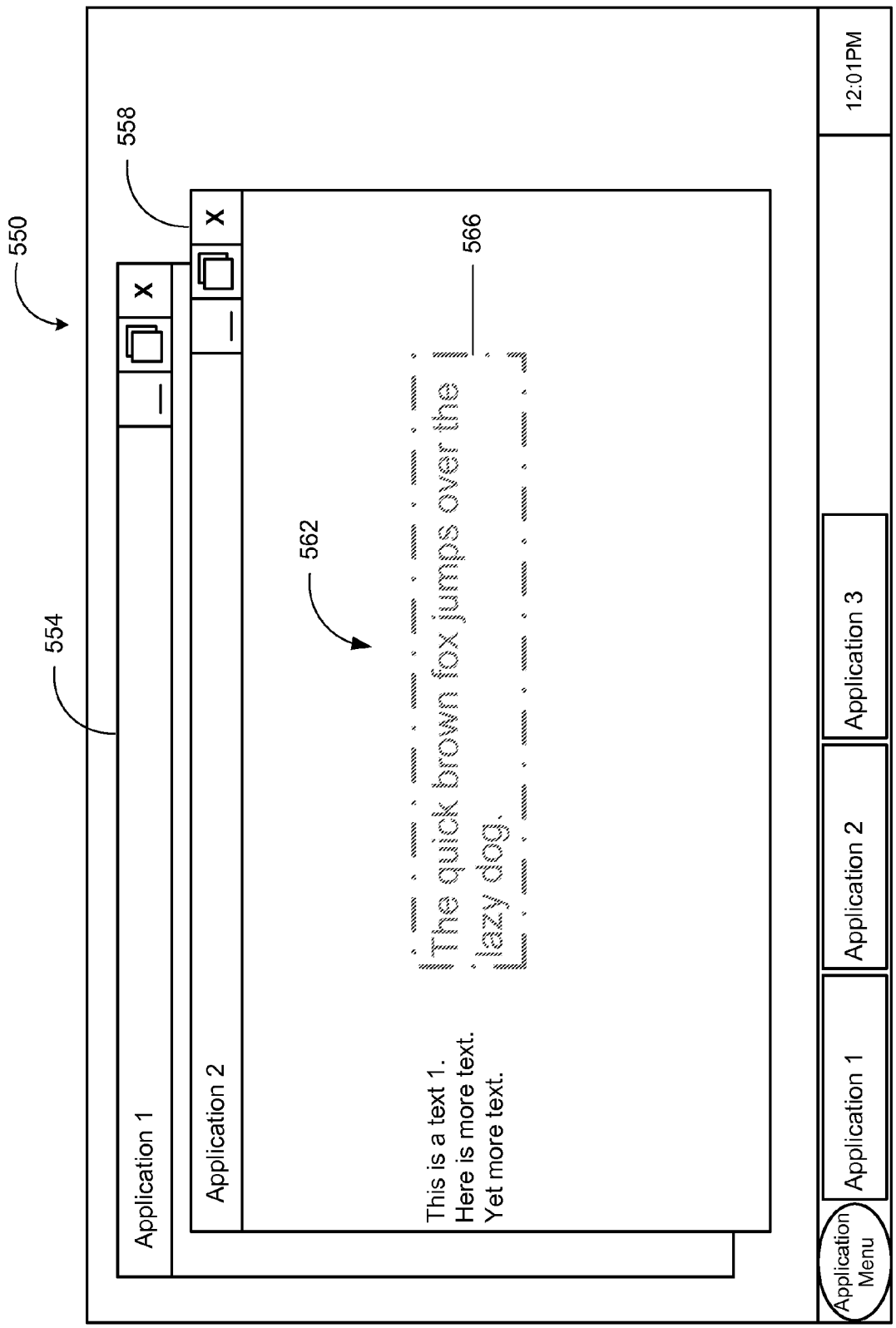
FIG. 5B illustrates an exemplary desktop environment, in accordance with another embodiment.

FIG. 5B illustrates a first exemplary desktop environment 550, in accordance with another embodiment. The desktop environment 550 includes two application windows 554 and 558 which are associated with two applications Application 1 and Application 2, executing on a computing system. The application window 558 is an active window and the application window 504 is a passive window. As discussed above, a user may select a data (e.g., text, image, video frame, etc.) from one of the applications and copy the data item in a buffer.

When the operating system receives an iterate command, the operating system may provide a preview 562 of the data item in the buffer which corresponds to the current iteration through the data items in the buffer. As shown in FIG. 5B, data item 566 is the data item corresponding to one of the data items in the buffer. The data item shown in the preview 562 may be the complete data item, or a portion of the data item. Although only text data is shown in the preview 562, in other embodiments, other types of data such as images, multimedia data, may be shown in the preview 562.

Data item 566, which contains the text "The quick brown fox jumped over the lazy dog." is the currently selected data item. As discussed above, the complete sentence for the data item 566 is displayed to the user, versus only part of the sentence, as shown in data item 516 of FIG. 5A. As the operating system receives iterate commands (e.g., Shift+V), the next data item in the buffer will be displayed in preview 562. For example, referring back to FIG. 5A, the next data item in the buffer contains the text "Alice." When the next iterate command is received by the operating system, preview 562 will display the text "Alice." After the user iterates to the desired data item in the preview 562, the user may use a paste command (e.g., Ctrl+V) to paste the desired data item into an application executing in the active application window 508 for Application 2.

As discussed above, the preview 562 may only be displayed to the user when one or more of a copy command, an iterate command, and a paste command are received. Also as discussed above, the preview 562 may be semi-transparent or may be displayed in a particular color or format to distinguish the preview 562 from other application windows shown in the desktop environment 550.

Figure 6:
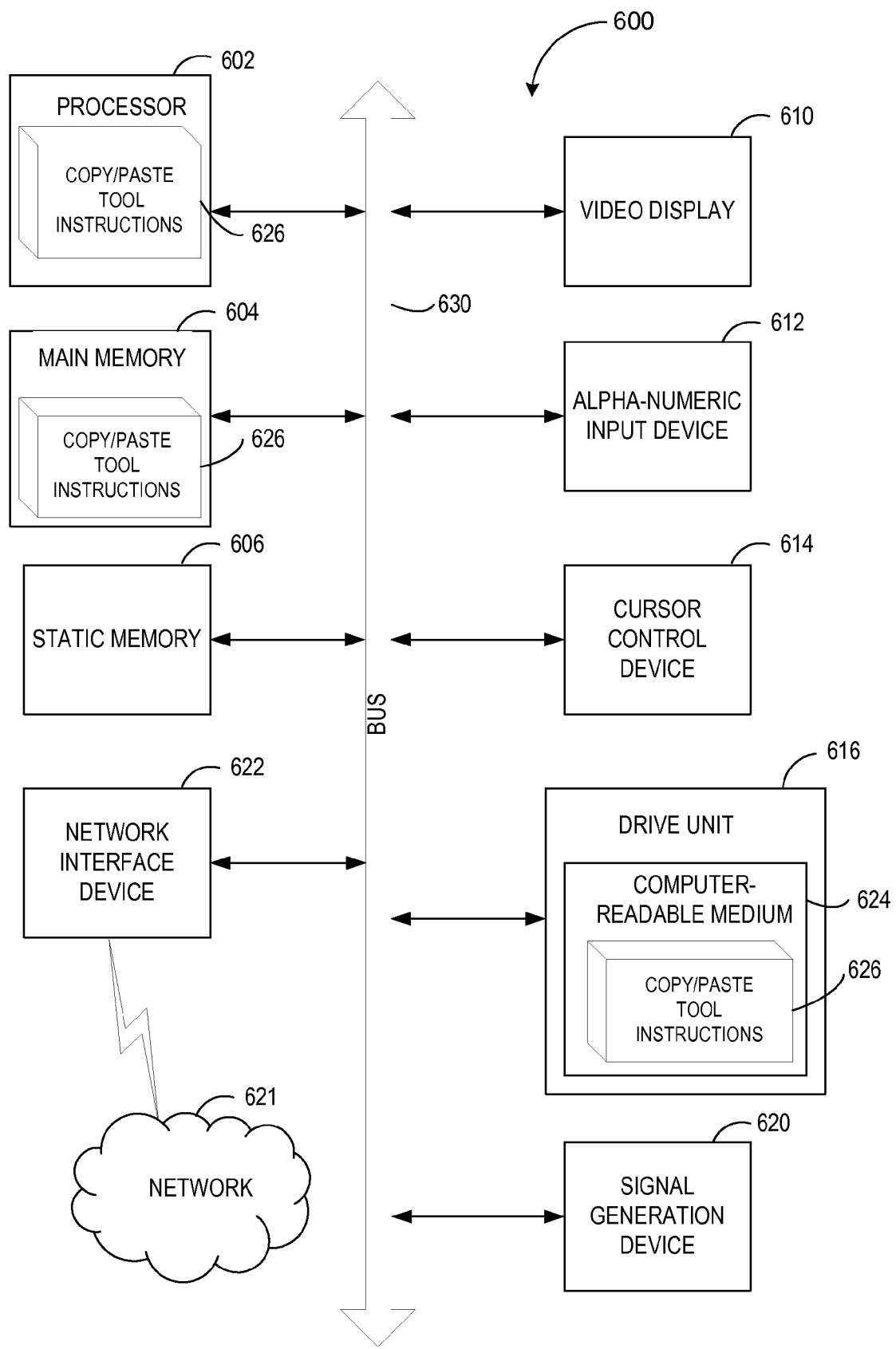
FIG. 6 illustrates a diagrammatic representation of a machine in the exemplary form of a computer system, in accordance with one embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute copy/paste tool 112 for performing the operations and steps discussed herein.

The computer system 600 may further include a network interface device 622. The network interface device may be in communication with a network 621. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions for copy/paste tool 112 embodying any one or more of the methodologies or functions described herein. The instructions of the copy/paste tool 112 may also reside, completely or at least partially, within the main memory 604 and/or within the processing device 602 during execution thereof by the computer system 600, the main memory 604 and the processing device 602 also constituting machine-readable storage media. The instructions of the copy/paste tool 112 may further be transmitted or received over a network via the network interface device 622.

While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "storing", "pasting", "presenting," "removing," "providing," and "copying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processor executing an operating system of a computer system, a plurality of copy commands issued by a user of the computer system at various time intervals to copy corresponding data items, the data items originating from a plurality of source applications executing in the computer system;
   storing, by the processor executing the operating system, the data items in a buffer, the data items remaining in the buffer after the plurality of source applications are no longer executing;
   receiving a first iterate command, wherein the first iterate command is a shortcut command of the operating system comprising a combination of key inputs;
   iterating from an initial data item to a next data item of the data items in the buffer in response to the first iterate command;
   displaying the next data item when the first iterate command is received;
   receiving, by the processor executing the operating system, a paste command issued by the user and an indication of the one of the data items in the buffer; and
   pasting, by the processor executing the operating system, the indicated data item into a target application executing in an active window.

2. The method of claim 1, wherein receiving the paste command comprises:
   receiving a user selection of the one of the data items.

3. The method of claim 2, wherein the at least one data item removed from the buffer comprises a least recently accessed data item.

4. The method of claim 1, further comprising:
   removing, without user interaction, at least one data item from the buffer when the buffer is full.

5. The method of claim 1, further comprising:
   removing one or more data items from the buffer in view of a user input or when a number of data items in the buffer exceeds a threshold.

6. The method of claim 1, further comprising:
   receiving a second iterate command, wherein the second iterate command is a same command as the first iterate command;
   displaying another data item when the iterate command is received; and
   receiving another paste command indicating a second one of the data items, wherein the second one of the data items is also pasted into the application executing in the active window.

7. The method of claim 1, wherein the buffer is part of an application integrated into the operating system.

8. The method of claim 1, further comprising: displaying the next item for a threshold period of time; and ceasing to display the next item after the threshold period of time expires.

9. An apparatus comprising:
   a memory comprising a buffer to store a plurality of data items;
   a processor integrated with an operating system operatively coupled to the memory, the processor to:
   receive a plurality of copy commands issued by a user of a computer system at various time intervals to copy a plurality of data items originating from a plurality of source applications to the buffer executing in the computing system;
   store the data items in a buffer, the data items remaining in the buffer after the plurality of source applications are no longer executing;
   receive a first iterate command, wherein the first iterate command is a shortcut command of the operating system comprising a combination of key inputs;
   iterate from an initial data item to a next data item of the data items in the buffer in response to the first iterate command;
   displaying the next data item when the first iterate command is received;
   receive a paste command issued by the user and an indication of the one of the data items in the buffer; and
   paste the indicated data item into a target application executing in an active window.

10. The apparatus of claim 9, wherein receiving the paste command comprises: receiving a user selection of the one of the data items.

11. The apparatus of claim 9, wherein the processor is further to:
   remove, without user interaction, at least one data item from the buffer when the buffer is full.

12. The apparatus of claim 11, wherein the at least one data item removed from the buffer comprises a least recently accessed data item.

13. The apparatus of claim 9, wherein the processor is further to:
remove one or more data items from the buffer in view of a user input or when a number of data items in the buffer exceeds a threshold.

14. The apparatus of claim 8, wherein the processor is further to:
receive a second iterate command, wherein the second iterate command is a same command as the first iterate command;
display another data item when the iterate command is received; and
receive another paste command indicating a second one of the data items,
wherein the second one of the data items is also pasted into the application executing in the active window.

15. A non-transitory machine-readable storage medium comprising an operating system comprising data that, when accessed by a processing device, cause the processing device to
receive, by the processing device executing the operating system, a plurality of copy commands issued by a user of the computer system at various time intervals to copy corresponding data items, the data items originating from a plurality of source applications executing in the computer system;
store, by the operating system, each data item in a buffer, the data items remaining in the buffer after the plurality of source applications are no longer executing;
receive a first iterate command, wherein the first iterate command is a shortcut command of the operating system comprising a combination of key inputs;
iterate from an initial data item to a next data item of the data items in the buffer in response to the first iterate command;
display the next data item when the iterate command is received;

receive, by the processing device executing the operating system, a paste command issued by the user comprising an indication of the one of the data items in the buffer; and
paste, by the processing device executing the operating system, the indicated data item into a target application executing in an active window.

16. The non-transitory machine-readable storage medium comprising the operating system of claim 15, wherein to receive the paste command, the processing device is to comprises: receive a user selection of the one of the data items.

17. The non-transitory machine-readable storage medium comprising the operating system of claim 15, wherein the processing device is further to:
remove, by the processing device, at least one data item from the buffer without a user interaction when the buffer is full.

18. The non-transitory machine-readable storage medium comprising the operating system of claim 17, wherein the at least one data item removed from the buffer comprises a least recently accessed data item.

19. The non-transitory machine-readable storage medium comprising the operating system of claim 15, wherein the processing device is further to:
remove by the processing device, one or more data items from the buffer in view of a user input or when a number of data items in the buffer exceeds a threshold.

20. The non-transitory machine-readable storage medium comprising the operating system of claim 15, wherein the processing device is further to:
receive a second iterate command, wherein the second iterate command is a same command as the first iterate command;
display another data item when the iterate command is received; and
receive another paste command indicating a second one of the data items, wherein the second one of the data items is also pasted into the application executing in the active window.

* * * * *